United States Patent
Nakata et al.

(10) Patent No.: US 9,113,117 B2
(45) Date of Patent: Aug. 18, 2015

(54) IMAGE-TAKING APPARATUS AND METHOD FOR CONTROLLING THE SAME

(71) Applicant: Canon Kabushiki Kaisha, Tokyo (JP)

(72) Inventors: Takamichi Nakata, Kawasaki (JP); Kentaro Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/749,054

(22) Filed: Jan. 24, 2013

(65) Prior Publication Data

US 2013/0194469 A1 Aug. 1, 2013

(30) Foreign Application Priority Data

Jan. 27, 2012 (JP) ................................ 2012-015544
Nov. 6, 2012 (JP) ................................ 2012-244599

(51) Int. Cl.
*H04N 9/68* (2006.01)
*H04N 5/232* (2006.01)
*H04N 5/235* (2006.01)

(52) U.S. Cl.
CPC ............... *H04N 9/68* (2013.01); *H04N 5/2351* (2013.01); *H04N 5/23245* (2013.01)

(58) Field of Classification Search
CPC ... H04N 5/23245; H04N 9/68; H04N 5/2351; H04N 5/21; H04N 5/243; H04N 5/2352; H04N 5/52; H04N 5/53; H04N 5/54; H04N 5/56; H04N 9/71; H04N 9/77
USPC ........... 348/222.1–230.1, 234–238, 252–256, 348/268–280, 289–293, 342, 360–367, 370, 348/300
See application file for complete search history.

(56) References Cited

U.S. PATENT DOCUMENTS

| 7,064,775 | B2 * | 6/2006 | Takakuwa ...................... 348/164 |
| 7,423,684 | B2 * | 9/2008 | Notagashira .................. 348/342 |
| 7,880,805 | B2 * | 2/2011 | Chino ........................... 348/361 |
| 2003/0142221 | A1 * | 7/2003 | Takakuwa ................... 348/222.1 |
| 2004/0090550 | A1 * | 5/2004 | Park .............................. 348/350 |
| 2006/0125949 | A1 * | 6/2006 | Notagashira .................. 348/342 |
| 2006/0244583 | A1 * | 11/2006 | Kawada ......................... 340/468 |
| 2008/0055426 | A1 * | 3/2008 | Pertsel et al. ............... 348/223.1 |
| 2011/0080498 | A1 * | 4/2011 | Kawada ...................... 348/222.1 |
| 2011/0169911 | A1 * | 7/2011 | Gabura ........................... 348/32 |

FOREIGN PATENT DOCUMENTS

JP  2010-279061 A  12/2010

* cited by examiner

*Primary Examiner* — Pritham Prabhakher
(74) *Attorney, Agent, or Firm* — Canon USA Inc. IP Division

(57) ABSTRACT

An image-taking apparatus changes a switching threshold value for switching between a color mode and a monochrome mode according to a maximum gain value set by a maximum gain setting unit so that switching between the color and monochrome modes can be optimally performed regardless of setting of the maximum gain value. The image-taking apparatus includes a threshold value correction unit configured to correct the switching threshold value according to the maximum gain value. The threshold value correction unit sets the switching threshold value with the maximum gain value set larger than an initial value to be smaller than the switching threshold value with the maximum gain value set smaller than the initial value.

10 Claims, 7 Drawing Sheets

IMAGE-TAKING APPARATUS AND METHOD FOR CONTROLLING THE SAME

BACKGROUND OF THE INVENTION

1. Field of the Invention

The present disclosure generally relates to an image-taking apparatus and a control method therefor and, more particularly, to those capable of appropriately switching an image output mode when a maximum gain value is set.

2. Description of the Related Art

A human color vision characteristic serving as a sensitivity to a color and a human luminous efficiency characteristic serving as a sensitivity to brightness fall within a range from 380 nm to 780 nm, which is referred to as a visible range. Humans have little sensitivity in a longer wavelength range than 700 nm. Generally in an image-taking apparatus, an infrared ray cut filter (IRCF) for visibility correction, which does not pass a light beam in a near-infrared region, is provided ahead of an image-pickup sensor so that color reproducibility can match the human color vision characteristic.

However, under low illumination at which a subject luminance decreases, the IRCF is often removed from an optical path so that the light beam in the near-infrared region is passed through the optical path, to increase the sensitivity. When the light beam in the near-infrared region is passed through the optical path, however, a color balance is lost. Therefore, an imaging mode is switched from a color image (a Day mode) to a monochrome image (a Night mode). A switching method also includes a function of automatically switching between a Day mode and a Night mode, which is referred to as an auto Day/Night (hereinafter referred to as an ADN).

In a lens having no IRCF insertion/removal mechanism, for example, a varifocal lens, the sensitivity cannot be increased, but noise that affects a color component can be removed. Therefore, there is a camera for merely switching an imaging mode from a color image to a monochrome image. A threshold value of the subject luminance at the time of switching from the color image to the monochrome image is determined based on automatic exposure (AE) data (a shutter speed, an iris, automatic gain control (AGC), a screen luminance) of the camera.

In recent years, cameras including a unit for setting a maximum gain value have been available, so that a scene having a screen a large part of which is black, e.g., a night scene can be clearly photographed by limiting a gain value of an AGC circuit.

An image-taking apparatus discussed in Japanese Patent Application Laid-Open No. 2010-279061, for example, uses a method for switching a mode by inserting or removing an infrared cut filter according to a determination result of at least one of outputs from an imaging unit and a luminosity detection unit.

However, in the configuration of the image-taking apparatus discussed in Japanese Patent Application Laid-Open No. 2010-279061, a maximum gain value cannot be set. On the other hand, in the camera having a function of setting a maximum gain value that has attracted a demand from a user in recent years, a determination reference value is not appropriately set in response to an output change according to the setting of the maximum gain value. Therefore, a mode switching cannot be correctly performed.

SUMMARY OF THE INVENTION

The present disclosure is directed to an image-taking apparatus capable of switching, with a simple configuration, an image output mode when a maximum gain value is set.

According to an aspect of the present disclosure, an image-taking apparatus includes a gain control unit configured to control a gain for amplifying a signal from an image-pickup sensor, an image data generation unit configured to generate image data representing a subject image captured by the image-pickup sensor, a switching unit configured to switch an output of the image data generated by the image data generation unit to either a color output or a monochrome output, a maximum gain setting unit configured to set a maximum value of the gain controlled by the gain control unit, a switching evaluation value calculation unit configured to calculate a switching evaluation value based on an output from the image data generation unit, a determination unit configured to determine the switching of the output of the image data by the switching unit based on a result of comparison between the switching evaluation value and a switching threshold value for switching the output of the image data to either a color output or a monochrome output, and a threshold value correction unit configured to correct the switching threshold value according to the maximum gain value set by the maximum gain setting unit. The threshold value correction unit sets the switching threshold value with the maximum gain value set larger than an initial value to be smaller than the switching threshold value with the maximum gain value set smaller than the initial value.

According to another aspect of the present disclosure, a method for controlling an image-taking apparatus includes generating image data representing a subject image captured by an image-pickup sensor, switching an output of the generated image data to either a color output or a monochrome output, setting a maximum value of a gain for amplifying a signal from the image-pickup sensor, calculating a switching evaluation value based on the output of the image data, determining the switching of the output of the image data based on a result of comparison between the switching evaluation value and a switching threshold value for switching the output of the image data to either a color output or a monochrome output, correcting the switching threshold value according to the set maximum gain value, and setting the switching threshold value with the maximum gain value set larger than an initial value to be smaller than the switching threshold value with the maximum gain value set smaller than the initial value.

According to exemplary embodiments of the present disclosure, a switching threshold value for switching between a color mode and a monochrome mode is changed according to the maximum gain value, so that switching to the color or monochrome mode can be optimally performed regardless of setting of a maximum gain value.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

A case where a camera is used as an image-taking apparatus will be described below.

Figure 1:
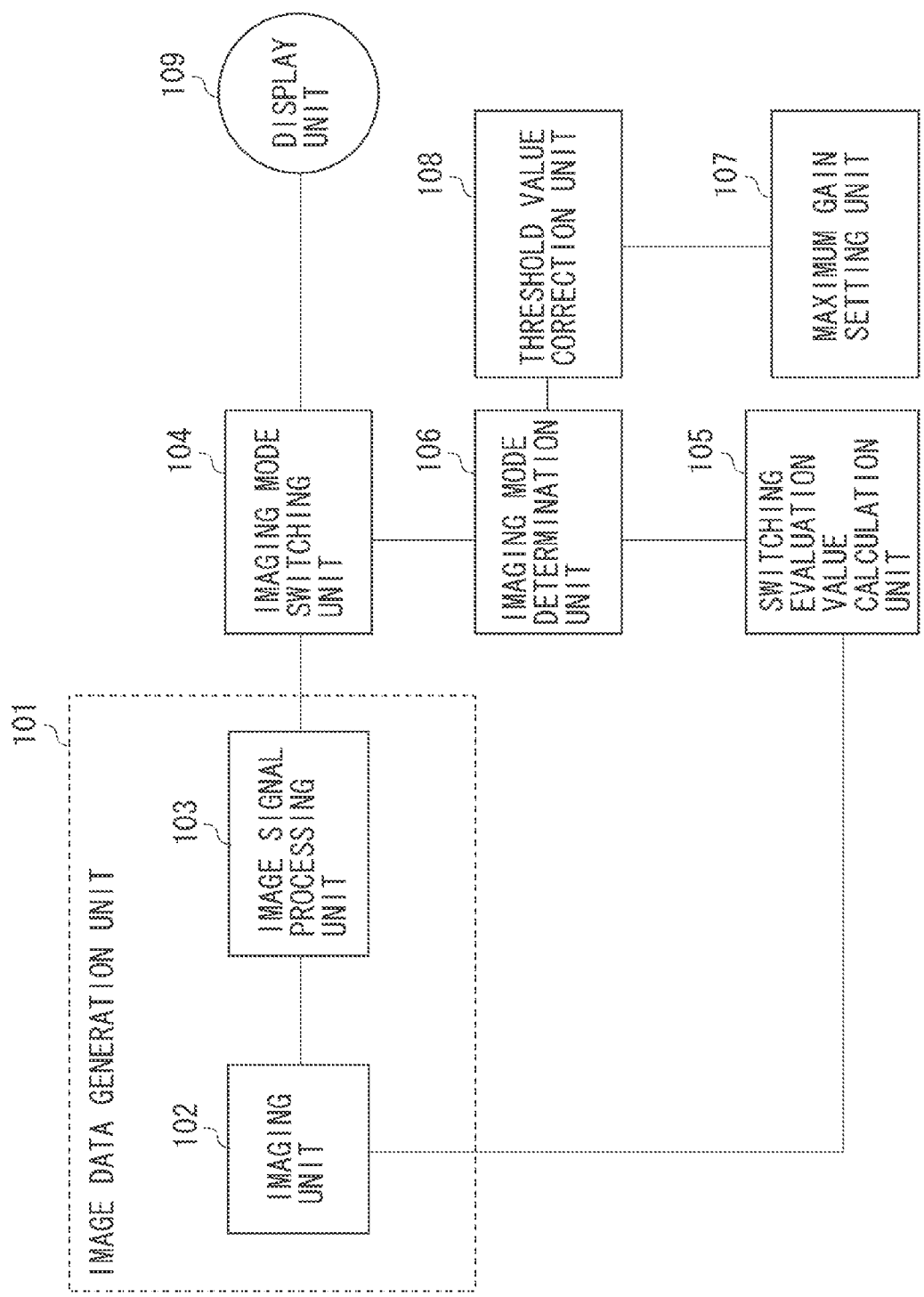
FIG. 1 illustrates a configuration of a camera according to a first exemplary embodiment of the present disclosure.

FIG. 1 illustrates a configuration of a camera according to a first exemplary embodiment of the present disclosure.

The camera includes an image data generation unit 101 configured to receive light from outside the camera to generate image data. The image data generation unit 101 includes an imaging unit 102 and an image signal processing unit 103 configured to subject a signal obtained from the imaging unit 102 to predetermined processing.

The camera includes an imaging mode switching unit 104 configured to switch image data to a monochrome image or a color image, and a switching evaluation value calculation unit 105 configured to calculate an evaluation value based on an output from the imaging unit 102. Further, the camera includes a maximum gain setting unit 107 capable of setting a maximum value of a gain by a user's operation, and a threshold value correction unit 108 configured to correct a predetermined switching threshold value for monochrome/color mode switching. The camera also includes an imaging mode determination unit 106 configured to determine the switching of the image data by the imaging mode switching unit 104 based on a result of comparison between the switching evaluation value and the switching threshold value for switching an output of the image data to either a color output or a monochrome output.

In addition, the camera includes a display unit 109 configured to display the image data output from the imaging mode switching unit 104 based on the result of comparison between the switching evaluation value and the switching threshold value.

Figure 2:
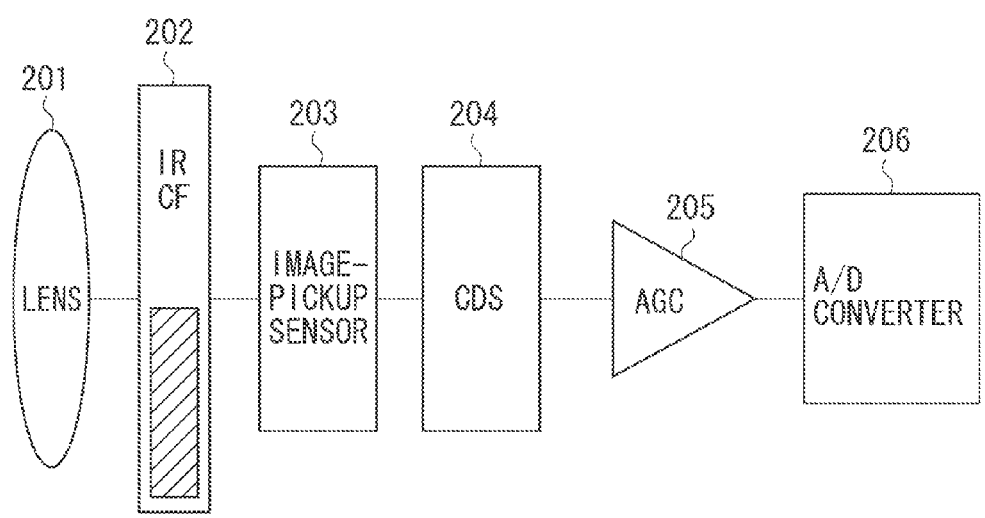
FIG. 2 illustrates a configuration of an imaging unit in the camera according to the first exemplary embodiment.

FIG. 2 illustrates a detailed configuration of the imaging unit 102.

The imaging unit 102 includes a lens 201 including several lens groups, a driving unit (not illustrated), an IRCF 202, which can be inserted and removed with respect to the lens 201 by the driving unit, and an image-pickup sensor 203, such as a charge coupled device (CCD) sensor or a complementary metal oxide semiconductor (CMOS) sensor. Further, the imaging unit 102 further includes a correlated double sampling (CDS) circuit 204 configured to reduce noise. The imaging unit 102 further includes an AGC circuit 205 configured to automatically control the gain of the camera.

In addition, the imaging unit 102 includes an analog-to-digital (A/D) converter 206 configured to convert an analog signal into a digital signal.

An operation of each of the above-mentioned constituent elements will be described in detail.

The image data generation unit 101 will be first described in detail with reference to FIGS. 1 and 2.

The image-pickup sensor 203 converts a subject image formed via the lens 201 serving as an imaging optical system and the IRCF 202 into an electric signal. The CDS circuit 204 performs correlated double sampling processing for the electric signal output from the image-pickup sensor 203. The AGC circuit 205 performs amplification processing for the electric signal output from the CDS circuit 204. The A/D converter 206 converts an analog signal, which has been subjected to the amplification processing by the AGC amplifier 205, into a digital signal.

The image signal processing unit 103 includes a digital signal processor (DSP), for example, and performs predetermined image processing on the digital signal, such as color conversion, AE processing, white balance (WB) processing, and gamma processing for performing gradation conversion of a signal-processed image.

The image data output from the image data generation unit 101 is input to the imaging mode switching unit 104, and is output after being converted into a monochrome image or a color image. While the imaging mode switching unit 104 is independently illustrated, the image signal processing unit 103 may include the imaging mode switching unit 104.

To switch between a monochrome image and a color image, the switching evaluation value calculation unit 105 calculates a switching evaluation value from imaging conditions such as a diaphragm, a shutter speed, and a gain, which have been output from the imaging unit 102. The switching between the monochrome image and the color image may be referred to as a Day/Night function. Therefore, in the present exemplary embodiment, an imaging mode of the camera is referred to as a Night mode for the monochrome image and a Day mode for the color image. The mode switching is hereinafter referred to as a Day/Night mode switching.

In the maximum gain setting unit 107 capable of setting the maximum value of the gain, a maximum gain value can be set. The maximum gain value indicates to what extent degradation due to a component such as noise or a sharpness feeling of an image can be permitted. For example, the setting may be opened to the user so that the user can optionally determine the setting or the setting can be automatically changed according to an internal state of the camera.

The threshold value correction unit 108 corrects a predetermined threshold value, for a predetermined Day/Night mode switching, to be the most suitable switching threshold value according to the maximum gain value set by the maximum gain setting unit 107.

The imaging mode determination unit 106 receives inputs from the switching evaluation value output by the switching evaluation value calculation unit 105 and the threshold value corrected by the threshold value correction unit 107, to determine which of the Day mode and the Night mode is used for the imaging mode switching unit 104 to output the image. If the switching evaluation value is smaller than the switching threshold value, for example, the image is output in the Night mode.

In the present exemplary embodiment, the imaging unit 102 includes the IRCF 202. When it is determined that the monochrome image is output to the switching unit 104, a signal is output to an IRCF driving unit (not illustrated). Then, in the IRCF driving unit, the IRCF 202 is removed from an optical path of the imaging optical system to receive an infrared component, to increase a subject luminance.

The image display unit 109 includes a liquid crystal display (LCD), for example, and displays the image data output from the switching unit 104.

Figure 3:
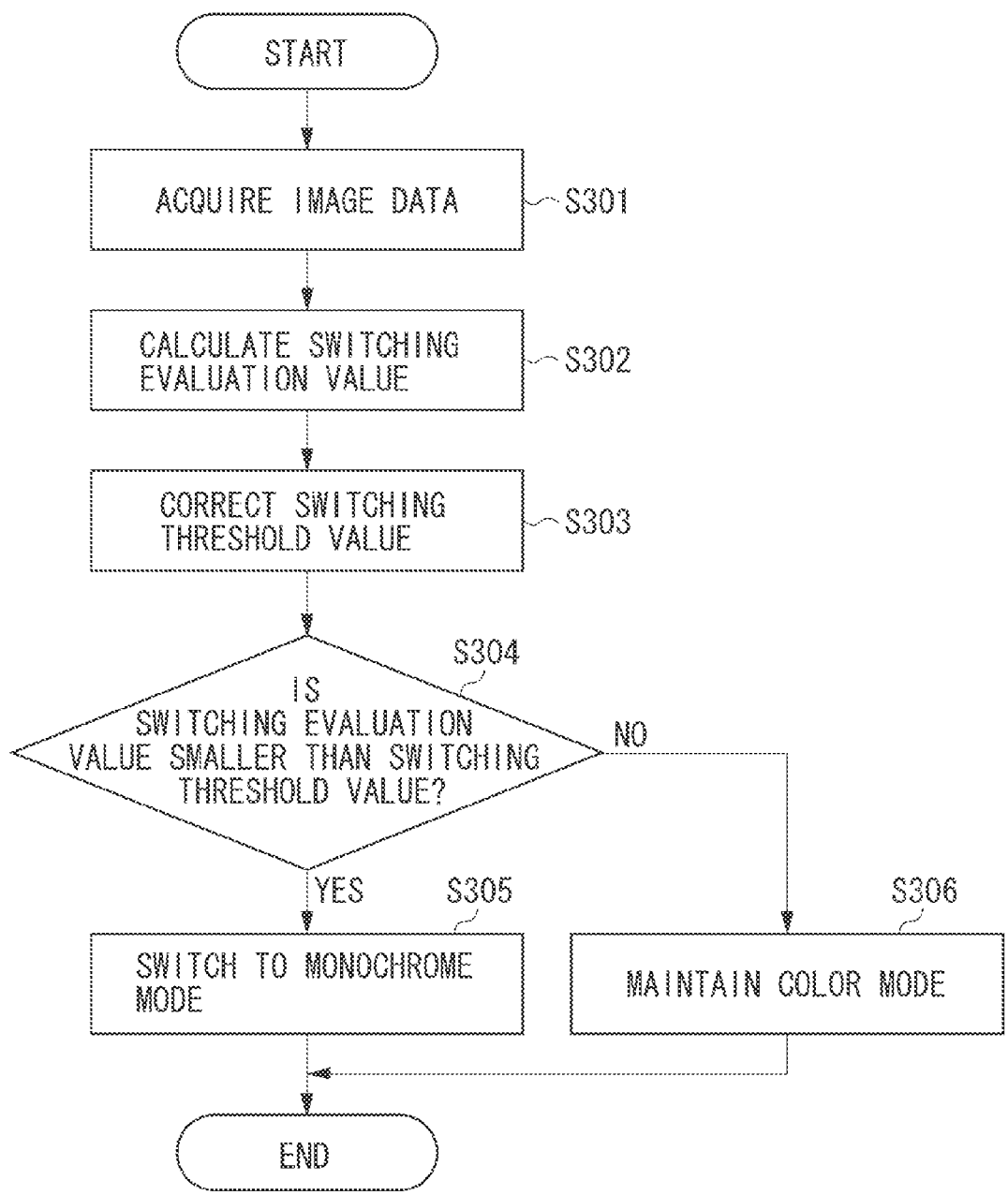
FIG. 3 is a flowchart illustrating processing of the camera according to the first exemplary embodiment.

With reference to a flowchart illustrated in FIG. 3, operation processing for switching the imaging mode of the camera from the Day mode to the Night mode will be described. If the imaging mode is the Day mode, the image data is output as a color image. The image data generation unit 101, the imaging mode switching unit 104, the switching evaluation value calculation unit 105, the imaging mode determination unit 106, the maximum gain setting unit 107, and the threshold value correction unit 108 mainly operate so that processing illustrated in the flowchart is implemented.

In step S301, the imaging mode switching unit 104 first acquires the image data output from the image data generation unit 101.

In step S302, the switching evaluation value calculation unit 105 calculates the switching evaluation value based on imaging conditions, i.e., a diaphragm value, a shutter speed, and an AGC gain value, which have been output from the imaging unit 102 in the image data generation unit 101.

An example of a method for calculating the switching evaluation value is illustrated below. A switching evaluation value S is expressed by the following equation:

$$S = \text{iris} + \text{shutter} + \text{AGC gain}$$

where iris, shutter, AGC gain are respectively the diaphragm value, the shutter speed, and the AGC gain value. Their respective values are illustrated below.

The switching evaluation value S is a value representing brightness in exposure, i.e., an EV. The EV is a logarithmic expression of each of the diaphragm value (F-number), the shutter speed (sec), and the AGC gain value (dB). The switching evaluation value S illustrated above is an example. The switching evaluation value S is also expressed by the following equation when a gain is applied by the image signal processing unit 103:

$$S = \text{iris} + \text{shutter} + \text{AGC gain} + \text{gain applied by image signal processing unit}$$

Thus, the switching evaluation value S can have various formats within the scope of the present disclosure.

In step S303, the threshold value correction unit 108 corrects a predetermined switching threshold value according to the maximum gain value, which is previously set by the user in the maximum gain setting unit 107. The predetermined switching threshold value may be a default value incorporated into the camera, or may be an optional value determined by the user. While the maximum gain value is to be optionally set by the user in the present exemplary embodiment, the value can be automatically set according to an imaging condition and a subject.

In step S304, the imaging mode determination unit 106 determines which of the switching evaluation value output by the switching evaluation value calculation unit 105 and the switching threshold value output by the threshold value correction unit 108 is larger. If the switching evaluation value is smaller than the switching threshold value (YES in step S304), i.e., if a subject having a low luminance is imaged, then in step S305, the imaging mode switching unit 104 switches the imaging mode to the Night mode. On the other hand, if the switching evaluation value is not smaller than the switching threshold value (NO in step S304), then in step S306, the imaging mode switching unit 104 maintains the Day mode.

An operation for switching from the Night mode (monochrome output) to the Day mode (color output) can also be implemented similarly to the above-mentioned operation. If the switching evaluation value is larger than the switching threshold value, the Night mode is switched to the Day mode. Further, if the camera includes the imaging unit 102 illustrated in FIG. 2, the IRCF 202 is removed from the optical path, simultaneously with switching to the Night mode, using the IRCF driving unit (not illustrated). On the other hand, the IRCF 202 is arranged again on the optical path, when switching to the Day mode.

An example of the present exemplary embodiment will be described with reference to FIGS. 4A to 4C.

The basic idea in the present exemplary embodiment will be first described with reference to FIGS. 4A to 4C. FIGS. 4A to 4C each illustrate an image of the subject obtained when the maximum gain value is changed at the same EV. The EV at this time is sufficiently small, and the image is not correctly exposed even when the maximum gain value is large (as illustrated in FIG. 4C). If the maximum gain value increases, the sensitivity also increases in proportion thereto. Therefore, the image brightness increases in the order of images in FIGS. 4A, 4B, and 4C. Similarly, if the maximum gain value increases, noise also increases. Therefore, the noise feeling becomes worse in the order of images in FIGS. 4A, 4B, and 4C.

Thus, the top image is low in sensitivity, and immediately disappears from view. Therefore, the switching threshold value for switching the imaging mode is set to be large. On the other hand, the bottom image is high in sensitivity, with a worse noise feeling. However, a range in which the subject can be recognized increases. Therefore, the bottom image is to be captured in the color mode for as long a time as possible. Thus, the switching threshold value is set to be small.

A more specific operation will be described below with reference to FIGS. 4A to 4C.

Figure 4A:
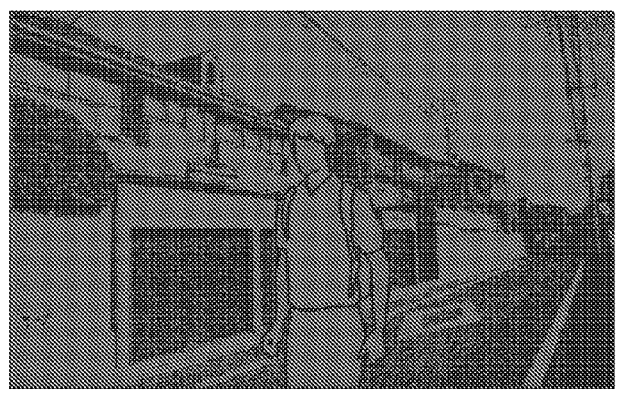
FIGS. 4A, 4B, and 4C each illustrate an image obtained when a maximum gain value changes at the same exposure value (EV) according to the first exemplary embodiment.
Figure 4B:

FIG. 4B illustrates an image obtained when the maximum gain value is set to an initial value. The image is intermediate in both noise feeling and brightness among the images illustrated in FIGS. 4A to 4C.

Figure 4C:

FIG. 4C illustrates an image captured in a case where the maximum gain setting unit 107 sets the maximum gain value to be larger than the initial value. FIG. 4C illustrates a state where a subject luminance is low at night and a gain value automatically reaches the maximum gain value. At this time, a noise amount becomes high, although the subject image becomes bright. In the state illustrated in FIG. 4C, a switching threshold value is decreased because the maximum gain value is set larger than the initial value.

Thus, the subject image can be captured in the color mode for a longer time than when the maximum gain value is set to the initial value. However, the gain value also increases by an amount corresponding to a rise in sensitivity, so that a noise component increases. The increase in the noise component constitutes a factor of significant deterioration in image recognition property.

To perform more effective monitoring, a switching threshold value may be changed by the user's setting. When a color component of the image is attached importance as an example, the switching threshold value is decreased from the initial value. On the other hand, when a recognition property of the subject is significantly decreased by the image deterioration due to the noise, the switching threshold value may remain at the initial value.

On the other hand, FIG. 4A illustrates an image captured in a case where the maximum gain setting unit 107 sets the maximum gain value to be smaller than the initial value. Thus, the noise component is smaller than that when the maximum gain value is set comparatively large. However, the brightness of a screen is high. At this time, when the screen becomes darker, the subject entirely disappears from view. Therefore, the sensitivity needs to be increased by early switching the imaging mode to the Night mode to remove the IRCF 202. Thus, the switching threshold value is set to be large.

The threshold value correction unit 108 corrects a predetermined switching threshold value according to a setting value of the maximum gain, so that the imaging mode can be switched when the image achieves a desired image quality, according to the present exemplary embodiment.

There can be a method for automatically acquiring a switching threshold value from a switching threshold value table according to setting of a maximum gain value or a method for automatically setting a switching threshold value by automatically adding and subtracting an EV of a difference from the initial maximum gain value to and from its initial switching threshold value. Alternatively, the user may manually set the threshold value.

A second exemplary embodiment of the present disclosure will be described below.

Figure 5:
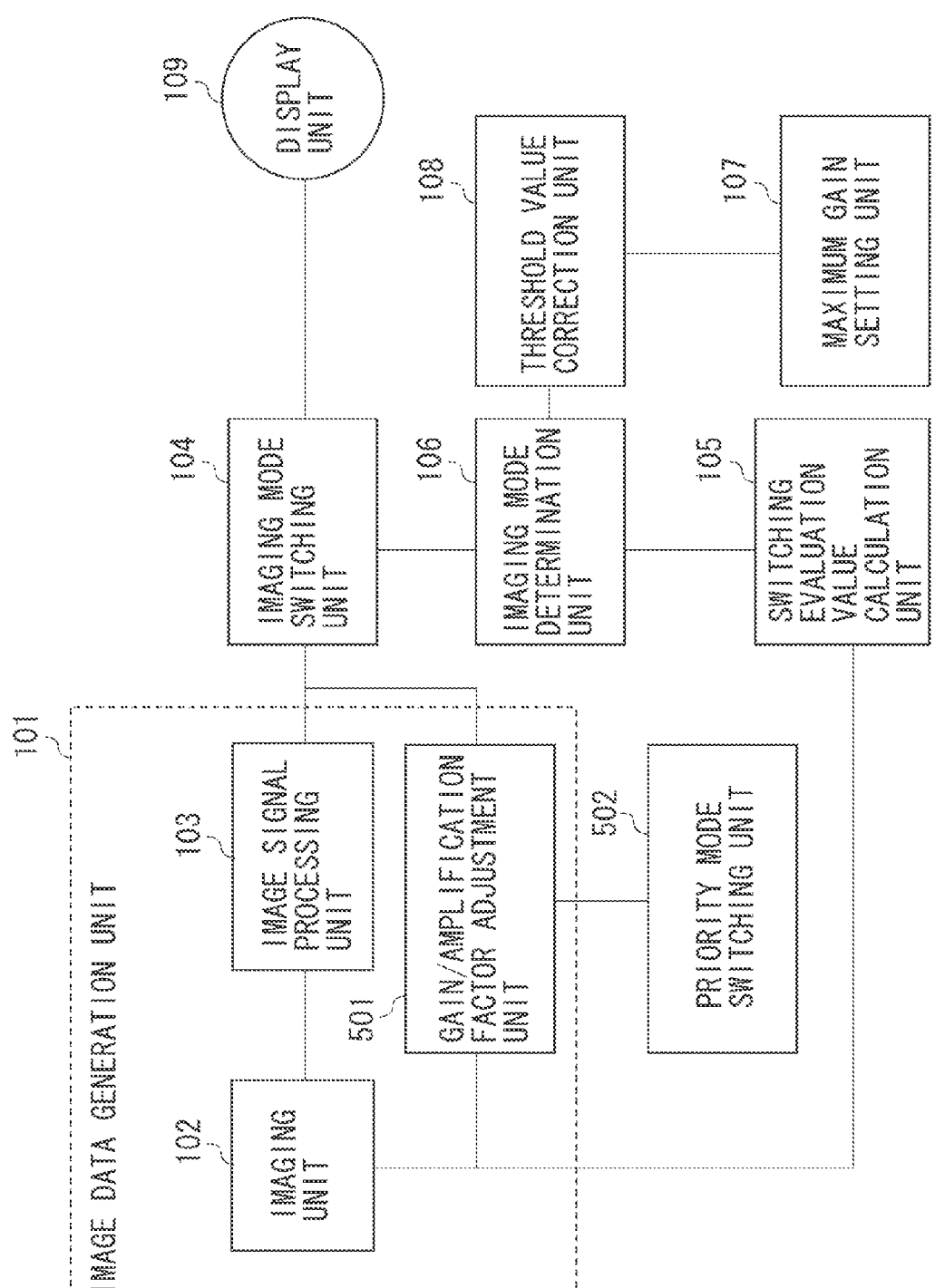
FIG. 5 illustrates a configuration of a camera according to a second exemplary embodiment.

FIG. 5 illustrates a configuration of a camera according to the second exemplary embodiment. In the second exemplary embodiment, constituent elements added to those in the first exemplary embodiment are mainly described, and similar constituent elements to those in the first exemplary embodiment are assigned with the same reference numerals, and hence description thereof is not repeated.

The camera includes a gain/amplification factor adjustment unit 501 configured to adjust an amplification factor serving as a gain of an image during switching and a priority mode switching unit 502 configured to switch a priority mode.

The gain/amplification factor adjustment unit 501 receives a Day/Night switching signal from an imaging mode switching unit 104, and simultaneously adjusts the gain of the image therewith. The gain amplification adjustment unit 501 also amplifies image data based on an amplification factor from the priority mode, which has been optionally set by a user, by the priority mode switching unit 502.

In the present exemplary embodiment, a WB gain is used as a gain control means, which is used by the gain/amplification factor adjustment unit 501. More specifically, the WB gain at which a color balance of the image is controlled in the image signal processing unit 103 is not required when a screen becomes monochrome in a Night mode.

The priority mode includes two modes, i.e., a sensitivity priority mode and a noise suppression priority mode. The two priority modes are used when the gain value is set to a value equal to or greater than the set maximum gain value to further increase the sensitivity in the Night mode. If the sensitivity is to be increased, the sensitivity priority mode is set. If a noise amount is to be suppressed or is to be manually set, the noise suppression priority mode is set.

In the sensitivity priority mode, the amplification factor controlled by the WB gain is maximized regardless of the set maximum gain value. If the amplification factor controlled by the WB gain is to be a maximum of two times, for example, the maximum gain value in the Night mode with any setting of the maximum gain value, is obtained by adding 6 dB to the maximum gain value in the Day mode so that the amplification factor in the Night mode is uniformly two times the amplification factor in the Day mode. The gain is calculated using the following equation:

$$x(dB)=20*\log 10(y(times))$$

Therefore, the gain value is to be 6 dB if the amplification factor is two times.

More specifically, the sensitivity priority mode is a mode for adding a gain to its maximum regardless of a noise amount, to ensure the maximum brightness of a screen. If the priority mode is set to the sensitivity priority mode with an output of the image data set to a monochrome output, the maximum amplification factor, which can be automatically adjusted by the gain/amplification factor adjustment unit 501, is set.

More specifically, when the maximum gain value set in the Night mode is 18 dB, the amplification factor in the Night mode is controlled to two times the amplification factor in the Day mode. When the maximum gain value set in the Night mode is 24 dB, the amplification factor in the Night mode is controlled to two times the amplification factor in the Day mode. When the maximum gain value set in the Night mode is 30 dB, the amplification factor in the Night mode is controlled to two times the amplification factor in the Day mode.

The noise suppression priority mode is a mode for varying the amplification factor controlled by the WB gain according to the set maximum gain value or for manually controlling the amplification factor controlled by the WB gain.

Alternatively, in the noise suppression priority mode, even if the Day mode is switched to the Night mode, the same maximum gain value as that in the Day mode may be maintained without adding an amount corresponding to the WB gain that is not required in the Night mode.

Figure 7:
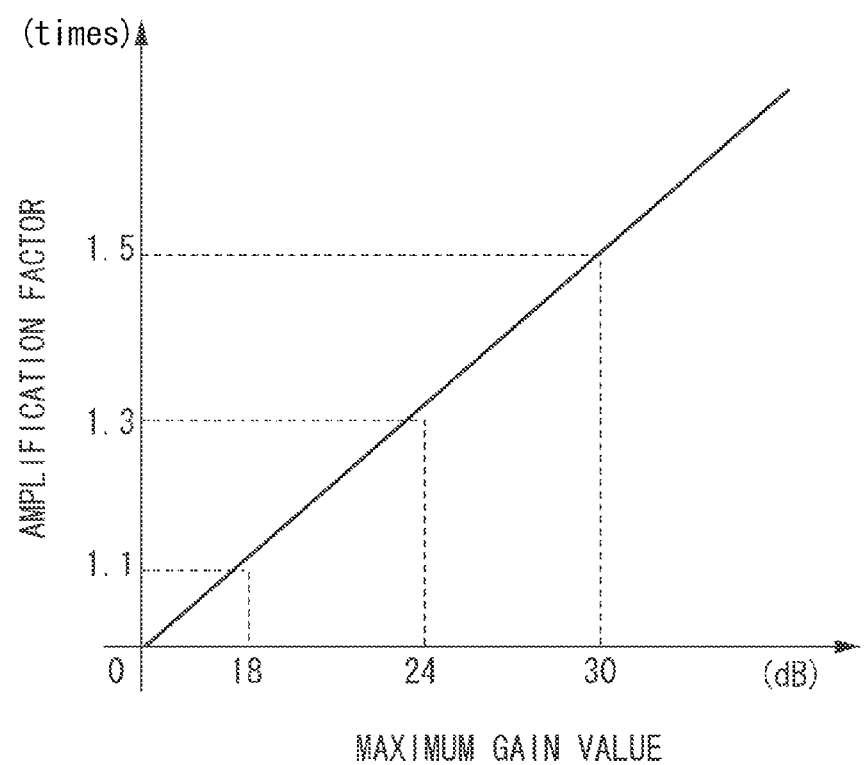
FIG. 7 illustrates an example of an amplification factor set in a noise suppression priority mode according to the second exemplary embodiment.

FIG. 7 illustrates an example of a control method performed when the amplification factor controlled by the WB gain is two times, for example. When the set maximum gain value changes, as illustrated in FIG. 7, the amplification factor controlled by the WB gain is controlled to change in proportion thereto.

In FIG. 7, when the maximum gain value set in the Night mode is 18 dB, the amplification factor in the Night mode is controlled to 1.1 times the amplification factor in the Day mode. When the maximum gain value set in the Night mode is 24 dB, the amplification factor in the Night mode is controlled to 1.3 times the amplification factor in the Day mode.

When the maximum gain value set in the Night mode is 30 dB, the amplification factor is controlled to 1.5 times. Thus, at the set maximum gain value in the Night mode, the amplification factor is set so that a balance between noise and brightness becomes most suitable. Alternatively, the user may set to what extent a gain is applied in the Night mode to the set maximum gain value.

Figure 6:
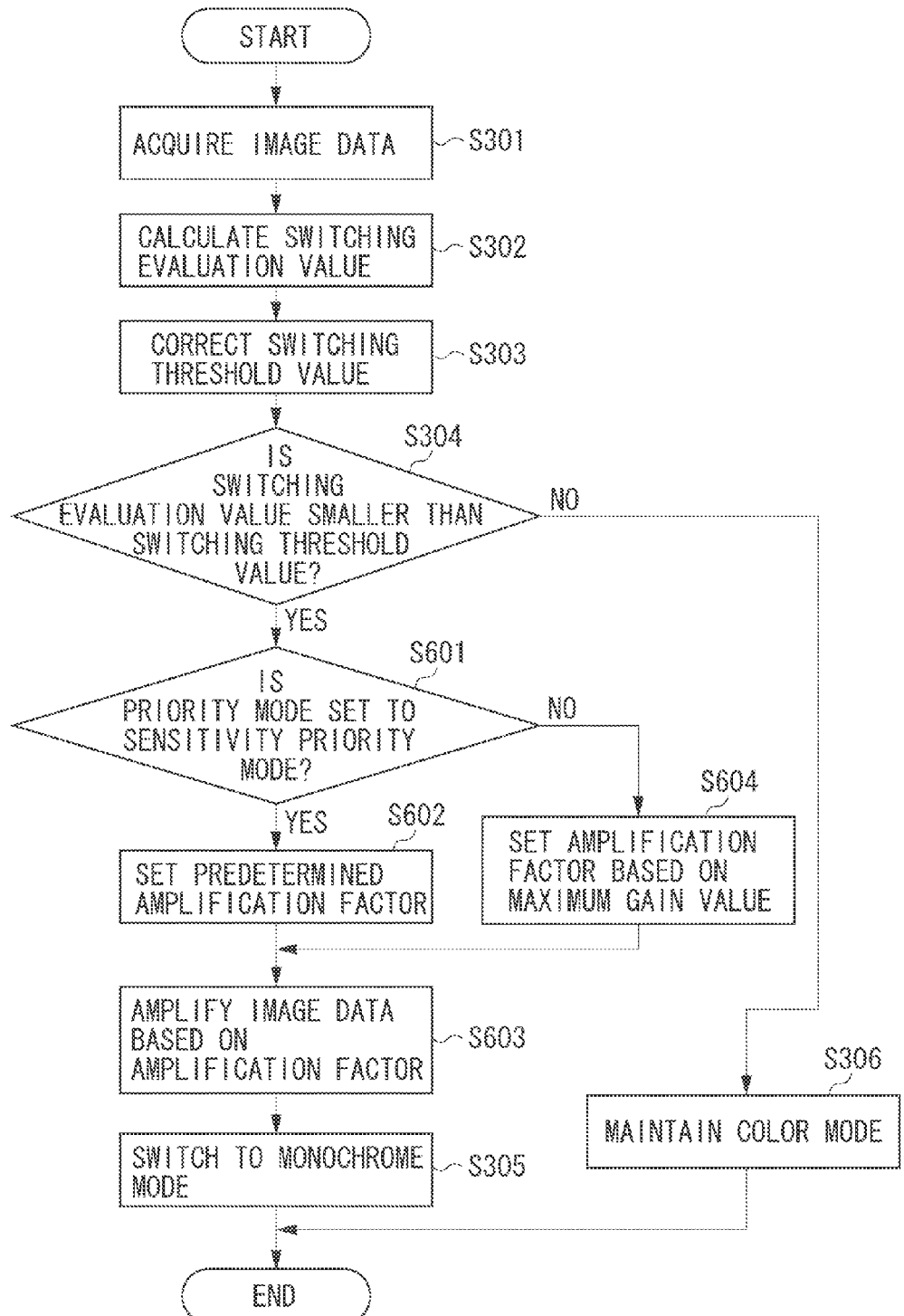
FIG. 6 is a flowchart illustrating processing of the camera according to the second exemplary embodiment.

With reference to a flowchart illustrated in FIG. 6, operation processing for the camera to switch the imaging mode from the Day mode to the Night mode will be described below. In the flowchart illustrated in FIG. 6, processing steps corresponding to those in the flowchart illustrated in FIG. 3 are assigned with the same step numbers, and hence description thereof is omitted.

First, steps S301 to S304 are similar to those in the first exemplary embodiment, and hence description thereof is not repeated. In step S601, the imaging mode determination unit 106 determines whether the priority mode set by the priority mode switching unit 502 is the sensitivity priority mode. If the priority mode is set to the sensitivity priority mode (YES in step S601), then in step S602, the priority mode switching unit 502 sets a predetermined amplification factor. In step S603, the set amplification factor is input to the gain/amplification factor adjustment unit 501 where the image data is amplified based on the set amplification factor.

If the priority mode is set to the noise suppression priority mode (NO in step S601), then in step S604, the gain/amplification factor adjustment unit 501 sets the amplification factor based on the maximum gain value. In step S603, the gain/amplification factor adjustment unit 501 then amplifies the image data according to the set amplification factor.

While the present disclosure has been described together with various exemplary embodiments, the present disclosure is not limited to the exemplary embodiments, and changes are made within the scope of the present disclosure. For example, in the above-mentioned exemplary embodiments, a digital still camera and a digital video camera can be applied to the camera described as an image-taking apparatus.

In the first and second exemplary embodiments, the image signal processing unit 103, the imaging mode switching unit 104, the switching evaluation value calculation unit 105, the imaging mode determination unit 106, the maximum gain setting unit 107, the threshold value correction unit 108, the gain/amplification factor adjustment unit 501, and the priority mode switching unit 502 may be implemented by a central processing unit (CPU) executing a program.

More specifically, the units constituting the image-taking apparatus according to the present exemplary embodiment and the steps constituting the method for controlling the image-taking apparatus can also be implemented by operating a program stored in a memory of a computer. The present disclosure includes the program and a computer-readable storing medium that stores the program.

In the present disclosure, an exemplary embodiment serving as a system, an apparatus, a method, a program, or a storage medium can also be realized. More specifically, the present disclosure may be applied to a system including a plurality of apparatuses.

In the present disclosure, a program for implementing a function of the above-mentioned exemplary embodiments may be supplied directly or remotely to the apparatus or the system. More specifically, the present disclosure may also be achieved when a computer in the system or the apparatus reads out and executes the supplied program.

Aspects of the present disclosure can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Applications No. 2012-015544 filed Jan. 27, 2012 and No. 2012-244599 filed Nov. 6, 2012, which are hereby incorporated by reference herein in their entirety.

What is claimed is:

1. An image-taking apparatus comprising:
a gain control unit configured to control a gain for amplifying a signal from an image-pickup sensor;
an image data generation unit configured to generate image data representing a subject image captured by the image-pickup sensor;
a switching unit configured to switch an output of the image data generated by the image data generation unit to either a color output or a monochrome output;
a maximum gain setting unit configured to set a maximum value of the gain controlled by the gain control unit;
a switching evaluation value calculation unit configured to calculate a switching evaluation value based on an output from the image data generation unit;
a determination unit configured to determine the switching of the output of the image data by the switching unit based on a result of comparison between the switching evaluation value and a switching threshold value for switching the output of the image data to either a color output or a monochrome output; and
a threshold value correction unit configured to correct the switching threshold value according to the maximum gain value set by the maximum gain setting unit,
wherein the threshold value correction unit sets the switching threshold value with the maximum gain value set larger than an initial value to be smaller than the switching threshold value with the maximum gain value set smaller than the initial value, and
wherein the gain control unit, the image data generation unit, the switching unit, the determination unit, and the threshold value correction unit are implemented, at least in part, by a processor and a memory in the image-taking apparatus.

2. The image-taking apparatus according to claim 1, wherein when a subject luminance becomes low, the color output of the image data is maintained for a longer time when the maximum gain value set by the maximum gain setting unit is large than when the maximum gain value set by the maximum gain setting unit is small.

3. The image-taking apparatus according to claim 1, further comprising:
a mode switching unit configured to switch between a noise suppression priority mode and a sensitivity priority mode; and
a gain/amplification factor adjustment unit configured to adjust the gain controlled by the gain control unit when the switching unit switches the output of the image data to the color output or the monochrome output.

4. The image-taking apparatus according to claim 3, wherein a maximum amplification factor adjustable by the gain/amplification factor adjustment unit is set, when the sensitivity priority mode is set with the output of the image data set to the monochrome output.

5. The image-taking apparatus according to claim 3, wherein an amplification factor adjustable by the gain/amplification factor adjustment unit increases as the maximum gain value set by the maximum gain setting unit increases, when the noise suppression priority mode is set with the output of the image data set to the monochrome output.

6. A method for controlling an image-taking apparatus, the method comprising:
generating image data representing a subject image captured by an image-pickup sensor;
switching an output of the generated image data to either a color output or a monochrome output;
setting a maximum value of a gain for amplifying a signal from the image-pickup sensor;
calculating a switching evaluation value based on the output of the image data;
determining the switching of the output of the image data based on a result of comparison between the switching evaluation value and a switching threshold value for switching the output of the image data to either a color output or a monochrome output;
correcting the switching threshold value according to the set maximum gain value; and
setting the switching threshold value with the maximum gain value set larger than an initial value to be smaller than the switching threshold value with the maximum gain value set smaller than the initial value.

7. A non-transitory computer-readable storage medium storing a program that causes a computer to perform a method comprising:
- generating image data representing a subject image captured by an image-pickup sensor;
- switching an output of the generated image data to either a color output or a monochrome output;
- setting a maximum value of a gain for amplifying a signal from the image-pickup sensor;
- calculating a switching evaluation value based on the output of the image data;
- determining the switching of the output of the image data based on a result of comparison between the switching evaluation value and a switching threshold value for switching the output of the image data to either a color output or a monochrome output;
- correcting the switching threshold value according to the set maximum gain value; and
- setting the switching threshold value with the maximum gain value set larger than an initial value to be smaller than the switching threshold value with the maximum gain value set smaller than the initial value.

8. The image-taking apparatus according to claim 1,
- wherein image data to be input into the switching unit is data amplified with a gain output from the gain control unit, and
- wherein the switching unit is configured to switch an output of the amplified data to either a color output or a monochrome output.

9. The method for controlling an image-taking apparatus according to claim 6,
- wherein image data to be input into a switching unit is data amplified with a gain output from a gain control unit, and
- wherein the switching unit is configured to switch an output of the amplified data to either a color output or a monochrome output.

10. The non-transitory computer-readable storage medium storing a program according to claim 7,
- wherein image data to be input into a switching unit is data amplified with a gain output from a gain control unit, and
- wherein the switching unit is configured to switch an output of the amplified data to either a color output or a monochrome output.

* * * * *